(12) United States Patent
DeVaul

(10) Patent No.: US 9,019,614 B2
(45) Date of Patent: Apr. 28, 2015

(54) DISPLAY DEVICE WITH IMAGE DEPTH SIMULATION

(75) Inventor: Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 13/281,780

(22) Filed: Oct. 26, 2011

(65) Prior Publication Data

US 2013/0107371 A1    May 2, 2013

(51) Int. Cl.
| G02B 27/14 | (2006.01) |
| F21V 7/04 | (2006.01) |
| G02B 3/00 | (2006.01) |
| G02B 5/02 | (2006.01) |
| G02B 27/01 | (2006.01) |

(52) U.S. Cl.
CPC ............. *G02B 3/0006* (2013.01); *G02B 5/02* (2013.01); *G02B 27/0172* (2013.01)

(58) Field of Classification Search
USPC ......... 359/618–619, 627, 628, 630–633, 599, 359/13; 362/600, 604–615, 617–620, 362/621–622, 627–628
See application file for complete search history.

(56) References Cited

U.S. PATENT DOCUMENTS

| 5,379,132 | A * | 1/1995 | Kuwayama et al. ............ 359/13 |
| 5,886,822 | A | 3/1999 | Spitzer |
| 6,072,632 | A | 6/2000 | Ophey |
| 6,222,508 | B1 | 4/2001 | Alvelda et al. |
| 7,364,341 | B2 * | 4/2008 | Parker et al. .................. 362/620 |
| 2006/0215244 | A1 | 9/2006 | Yosha et al. |
| 2010/0046070 | A1 * | 2/2010 | Mukawa ....................... 359/480 |
| 2010/0046075 | A1 | 2/2010 | Powell et al. |
| 2010/0060551 | A1 * | 3/2010 | Sugiyama et al. ................ 345/8 |
| 2010/0157433 | A1 * | 6/2010 | Mukawa et al. .............. 359/633 |
| 2010/0253688 | A1 | 10/2010 | Cui |
| 2010/0278480 | A1 * | 11/2010 | Vasylyev ........................ 385/33 |
| 2010/0321409 | A1 | 12/2010 | Komori |
| 2014/0268871 | A1 * | 9/2014 | Morgan et al. ................ 362/607 |

FOREIGN PATENT DOCUMENTS

| WO |     2010092409 A1 | 8/2010 |
| WO | WO2010/097439 A1 | 9/2010 |

OTHER PUBLICATIONS

PCT International Search Report and Written Opinion, PCT International Application No. PCT/US2012/059596 dated Mar. 29, 2013.

* cited by examiner

*Primary Examiner* — Scott J Sugarman
*Assistant Examiner* — Robert E Tallman
(74) *Attorney, Agent, or Firm* — McDonnell Boehnen Hulbert & Berghoff LLP

(57) ABSTRACT

An optical system is provided with a transparent element having a proximal surface on one side and a distal surface on an opposite side. A plurality of light-scattering structures is formed in the distal surface. A positionally-corresponding plurality of surface lenses is provided on the proximal surface. The light-scattering structures and the surface lenses may be arranged in a slightly angled or offset square array relative to a side surface of the transparent element. A rastering, collimated light source, directs a beam of light roughly in the plane of the transparent element towards individual light-scattering structures. The light-scattering structures scatter at least a portion of the light towards the corresponding surface lenses, which may collect and collimate the light towards a viewing location. The optical system may be incorporated into a head-mounted display (HMD).

15 Claims, 12 Drawing Sheets

DISPLAY DEVICE WITH IMAGE DEPTH SIMULATION

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, an optical system is provided. The optical system includes a transparent element having a proximal surface and a distal surface opposite the proximal surface. A real-world environment is viewable through the proximal surface in combination with the distal surface. The optical system further includes a plurality of light-scattering structures on the distal surface, a rastering light source configured to illuminate individual light-scattering structures on the distal surface, and a plurality of surface lenses on the proximal surface. Each surface lens is optically coupled to at least one respective light-scattering structure so as to collimate light scattered therefrom towards a viewing location.

In a second aspect, a head-mounted display is provided. The head-mounted display includes a head-mounted support and at least one optical system. The at least one optical system is attached to the head-mounted support and includes a transparent element having a proximal surface, a distal surface opposite the proximal surface, and a side surface. A real-world environment is viewable through the proximal surface in combination with the distal surface. The at least one optical system further includes a plurality of light-scattering structures on the distal surface, a rastering light source configured to illuminate individual light-scatting structures through the side surface of the transparent element, and a plurality of surface lenses on the proximal surface. Each surface lens is optically coupled to at least one respective light-scattering structure so as to collimate light scattered therefrom towards a viewing location.

In a third aspect, a method is provided. The method includes selecting a virtual image to be displayed using an optical system. The optical system includes a plurality of light-scattering structures on a distal surface of a transparent element and a plurality of surface lenses on a proximal surface of the transparent element. The method further includes selecting a set of light-scattering structures based on the virtual image, and controlling a light source to illuminate individual light-scattering structures in the selected set, such that the light scattered therefrom is collimated by a corresponding set of surface lenses to form the virtual image.

DETAILED DESCRIPTION

Figure 1:
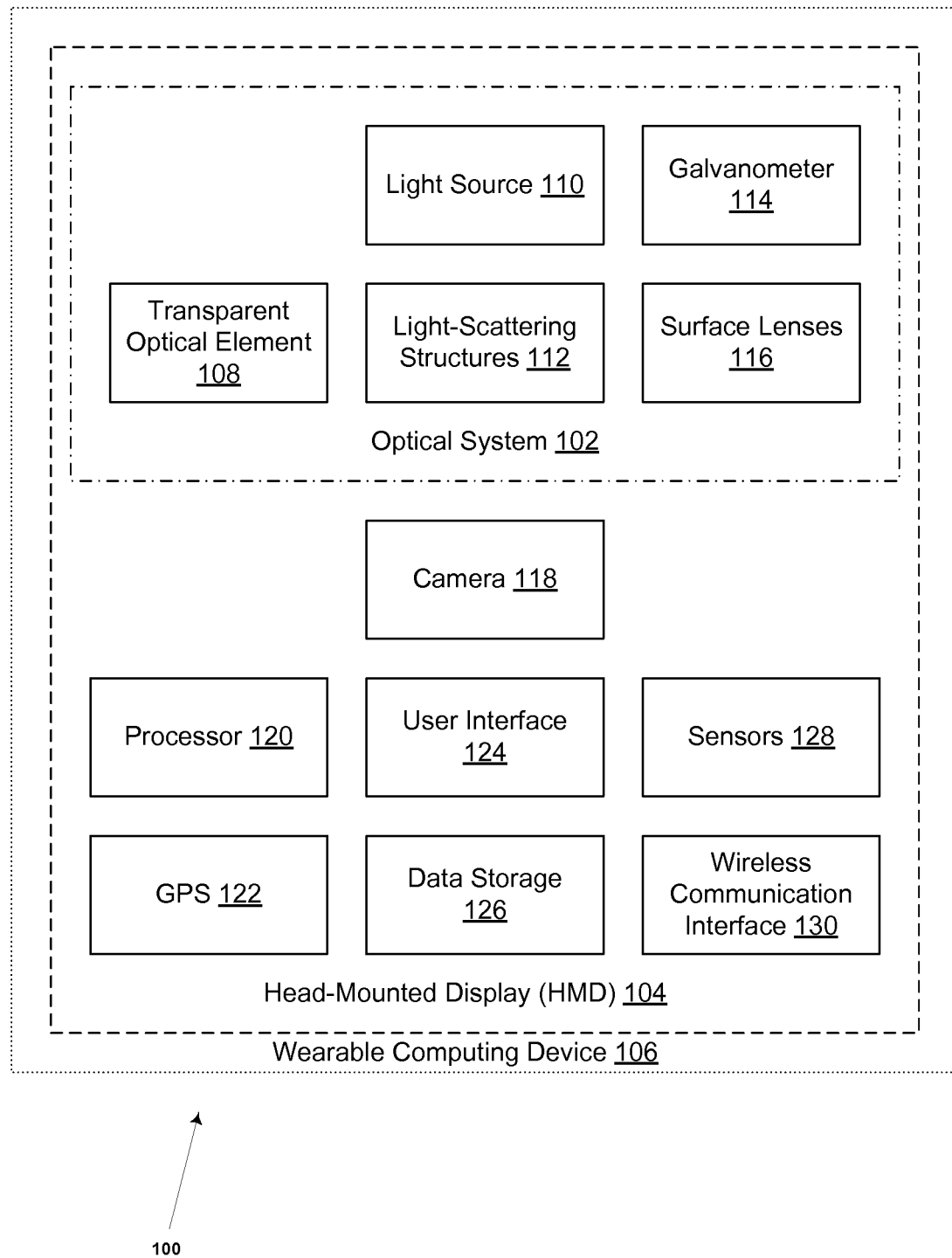
FIG. 1 is schematic diagram of a wearable computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

By combining a light source, a plurality of light-scattering structures, and a plurality of focusing/collimating elements, an optical system may be realized. The optical system could be implemented using a combination of glass, plastic, polymethylmethacrylate (PMMA), dielectric and/or metal materials and may be positioned near the eye of a viewer to provide an image display. Multiple optical systems may be implemented to provide a binocular view.

The light source of the optical system may include, for instance, a diode laser and galvanometer to direct the laser beam in one or two dimensions. The laser beam could be steered towards individual light-scattering structures located on the distal surface of a transparent optical element, such as a lens. These light-scattering structures may be in the form of pits, prisms or gratings in the transparent optical element and may be used as individual light pixels. The scattered light from these light-scattering structures could be collected and collimated towards a viewer's eye with a surface lens located on the proximal surface of the transparent optical element. Since the light-scattering structures and surface lenses are fabricated on different surfaces of the transparent optical element, the elements could be moved with respect to one another in order to tune the position of the light-scattering structures and the angle at which collimated light is projected towards a viewer's eye from a particular surface lens, the combination of which may be considered a 'light pixel'. Those skilled in the art will understand that a plurality of such light pixels in a regular or irregular array could be used to form virtual images that may be presented to a viewer's eye(s).

A head-mounted display ("HMD") may enable its wearer to observe the wearer's real-world surroundings and also view a displayed image, such as a computer-generated image. In some cases, the displayed image may overlay a portion of the wearer's field of view of the real world. Thus, while the wearer of the HMD is going about his or her daily activities, such as walking, driving, exercising, etc., the wearer may be able to see a displayed image generated by the HMD at the same time that the wearer is looking out at his or her real-world surroundings.

The displayed image might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view. The displayed image could be displayed continuously or only at certain times (e.g., only when the wearer is engaged in certain activities).

The HMD may utilize an optical system to present virtual images overlaid upon a real-world view to a wearer. To display a virtual image to the wearer, the optical system may as described above. The HMD computer may control the light source to generate light patterns and transmit the virtual images towards the wearer's eye(s).

Certain illustrative examples of forming a virtual image using an optical system and a head-mounted display are described below. It is to be understood, however, that other embodiments are possible and are implicitly considered within the context of the following example embodiments.

2. Optical System for Forming Virtual Images

FIG. 1 is schematic diagram of a system 100 that includes at least one optical system 102. Optical system 102 may include a transparent optical element 108, a light source 110, light-scattering structures 112, a galvanometer 114, and surface lenses 116. The optical system 102 may be part of a head-mounted display (HMD) 104, which could further include a camera 118, processor 120, global positioning system (GPS) 122, user interface 124, data storage 126, sensors 128 and a wireless communication interface 130. The HMD 104 may further be operable as, or part of, a wearable computing device 106.

Elements of system 100 may be configured to work with other elements within or outside their respective systems. For example, system 100 may interact with various sensors 128, the processor 120, and other elements of the system 100 in order to provide virtual images that may appear to a viewer at various apparent distances. In practice, when observing a real-world object, it may be useful to superimpose virtual images at an apparent distance that may match the actual distance to the object. By using sensors 128, which may include a rangefinder, a distance to an object may be determined. The camera 118, processor 120 and data storage 126 may be used to determine the type of object that is being viewed. A virtual image based on the object may be selected. The virtual image may be associated with an apparent distance and a selected set of light-scattering structures 112 and surface lenses 116. The processor 120 may then control the light source 110 and the galvanometer 114 to illuminate individual light-scattering structures in the selected set.

In another example embodiment, system 100 may provide information regarding a nearby landmark. For instance, the global positioning system 122 may provide current location information to the processor 120. This current location information may be compared to a database of known locations stored in data storage 126. If the processor 120 determines that the current location is near a known location (in this case, the landmark) from the database, the processor 120 may query a server via the wireless communication interface 130 to obtain further information about the landmark. A virtual image and corresponding set of light-scattering structures may be selected. The processor 120 may then control the light source 110, and galvanometer 114 to illuminate the selected set of light-scattering structures. Thus, a virtual image with information associated with the known location may be displayed to a wearer of the HMD.

Although FIG. 1 depicts the optical system 102 as a part of the head-mounted display 104 and the wearable computing device 106, it should be understood that the optical system 102 could be a stand-alone system or could be incorporated into other types of near-eye display systems such as heads-up displays (HUDs), or into other display devices such as televisions and smartphones.

The light source 110 of optical system 102 may represent one or more semiconductor laser diodes, light-emitting diodes (LEDs), or other sources of light as understood in the art. The light source 110 may be optically coupled to a galvanometer 114. The galvanometer 114 could comprise a beamsplitter or prism device with at least a portion of the device formed from an electrooptic material, the refractive index of which may be changed with an applied voltage. By controlling the voltage applied to the electrooptic material, a refractive index of the electrooptic material may be modulated, which may in turn modulate the output direction vector of a light beam. Thus, a light beam from the light source 110 may be directed by the galvanometer 114 in one or more degrees of freedom and may further act as an input light beam for the optical system 102. The electrooptic material could comprise lead zirconium titanate (PZT) or a similar material that exhibits a change of refractive index with an applied voltage. The galvanometer 114 could additionally or alternatively include a closed or open-loop servomechanism configured to direct the input light beam from the light source 110. Manufacturers of such moving servomirror mechanisms include Cambridge Technology (Lexington, Mass.) and Scanlab (Munich, Germany).

The transparent optical element 108 of optical system 102 could be, for example, one or more lenses in eyeglasses, goggles, or binoculars, and may be substantially transparent in the visible wavelengths. Alternatively, the transparent optical element 108 could be a windshield of an automobile, in a visor, or could be an ocular lens in a microscope or a telescope. The transparent optical element 108 could have other forms as well. The transparent optical element 108 could be made of glass, plastic, a polymer material such as polymethylmethacrylate (PMMA), or could comprise another optical materials known in the art or combinations thereof.

The transparent optical element 108 may include at least two principal surfaces, a proximal surface, which may be the surface closest to a viewing location, and a distal surface located substantially opposite the proximal surface. Furthermore, the transparent optical element 108 may include a side surface that may connect between the proximal and distal surfaces.

The light-scattering structures 112 may be located on the distal surface of the transparent optical element 108. The light-scattering structures 112 may comprise pits or trenches in the distal surface and may function to scatter light at least partially towards the proximal surface of the transparent optical element 108. These light-scattering structures 112 may be coated on one or more sides with a dielectric and/or metallic thin film material, such as those known in the art for their anti-reflective or highly reflective qualities. Light-scattering structures 112 could have a characteristic size ranging from several millimeters down to a few wavelengths of the designed light-scattering wavelength.

Surface lenses 116 may comprise spherical and/or aspherical lenses configured to collect light scattered from light-scattering structures 112 and collimate the scattered light towards a viewing location. The surface lenses 116 may be located on the proximal surface of the transparent optical element 108. Further, the surface lenses 116 may be positioned to correspond to respective light-scattering structures. For instance, each surface lens could be positioned and geometrically shaped to collect scattered light from one or more specific light-scattering structures.

The surface lenses 116 may be made from the same materials as the transparent optical element 108, or may comprise a different optical material known in the art. The surface lenses 116 may be optically coupled to the transparent optical element 108. Further, the surface lenses 116 may be coated on one or more sides with a dielectric and/or metallic thin film material, such as those known in the art for their anti-reflective or highly reflective qualities. The surface lenses 116 could have a characteristic size ranging from several millimeters down to a few wavelengths of the designed wavelength.

The light source 110 may be optically-coupled, although not necessarily physically-coupled, to the transparent optical element 108. In one embodiment, the light source 110 is mounted along a side surface of the transparent optical element 108 and the galvanometer 114 may be direct a light beam from light source 110 into the transparent optical element 108 through the side surface.

Figure 2A:
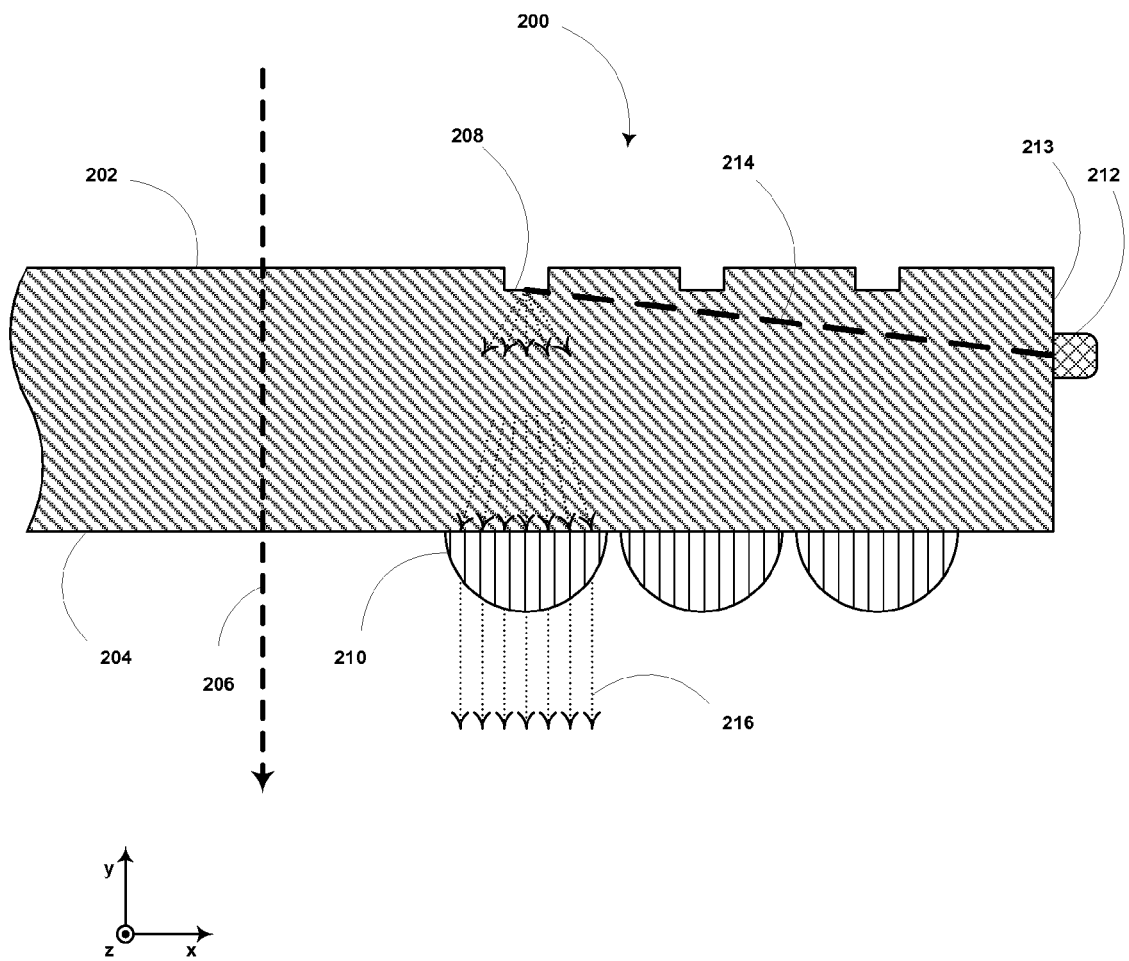
FIG. 2A is a schematic cutaway view of an optical system, in accordance with an example embodiment.

FIG. 2A is a schematic cutaway view of an example optical system that includes a transparent optical element 200 with a distal surface 202 and a proximal surface 204. A plurality of light-scattering structures 208 is located on the distal surface 202. A corresponding plurality of surface lenses 210 is located on the proximal surface 204. Each of the light-scattering structures 208 is configured to scatter light towards one or more of the surface lenses 210. Each of the surfaces lenses 210 is configured to collect light scattered from one or more of the light-scattering structures 208 and collimate the light into an output light beam 216 directed towards a viewing location (not pictured). A real-world scene may be viewable at the viewing location, for example, along an optical axis 206. The optical axis 206 may extend through a portion of the transparent optical element 200 that does not include light-scattering structures 208 and surface lenses 210.

A light source 212 or plurality of light sources may introduce light into the transparent optical element 200 through a side surface 213 in the form of input light beam 214 directed towards a particular one of the light-scattering structures 208. Although FIG. 2A depicts the input light beam 214 introduced through the side surface 213, it is possible to illuminate the light-scattering structures 208 through the proximal surface 204 and/or the distal surface 202. Further, although FIG. 2A depicts a linear array of three light-scattering structures 208 and three surface lenses 210, it should be understood that two-dimensional arrays and other physical placements of both sets of structures are possible in practice. A greater or lesser number of light-scattering structures 208 could be included in transparent optical element 200 compared to the number of surface lenses 210 in transparent optical element 200.

In one embodiment, the light-scattering structures 208 and corresponding surface lenses 210 may be arranged in a square array, the edge of the square array rotated with respect to the edge surface on which the light source 212 is mounted. Thus, the light source 212 may have a direct line-of-sight' towards each of the light-scattering structures 108 in order to illuminate individual light-scattering structures 208 with an input light beam 214.

Figure 2B:
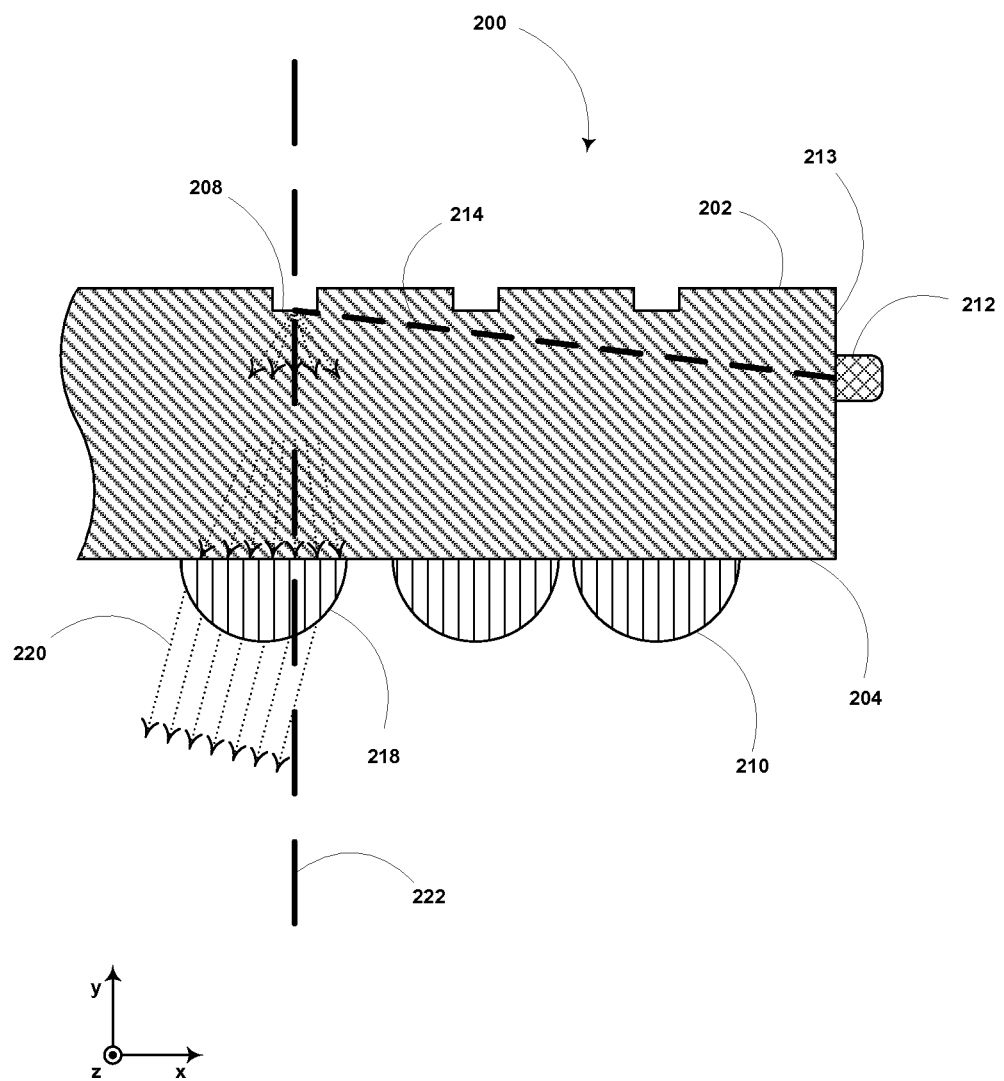
FIG. 2B is a schematic cutaway view of an optical system, in accordance with an example embodiment.

FIG. 2B is a schematic cutaway view of an example optical system that includes a transparent optical element 200 with light-scattering structures 208 on a distal surface 202 and with surface lenses 210 on a proximal surface 204. In an example embodiment, a shifted surface lens 218 could be shifted in position away from a reference axis 222 related to the center of a respective light-scattering structure 208. Although FIG. 2B depicts the shifted surface lens 218 as shifted in the negative x direction with respect to the reference axis 222, other modifications to the position and shape of shifted surface lens 218 are possible in order, for instance, to direct the output light beam 220 towards a particular viewing location with a particular beam angle. For example, the size and shape of the surface lens may be altered to adjust the output light angle or the degree of the output light beam defocus or focus. Additionally, the shifted surface lens 218 may be translated in any axis to achieve the desired output light profile.

Figure 2C:
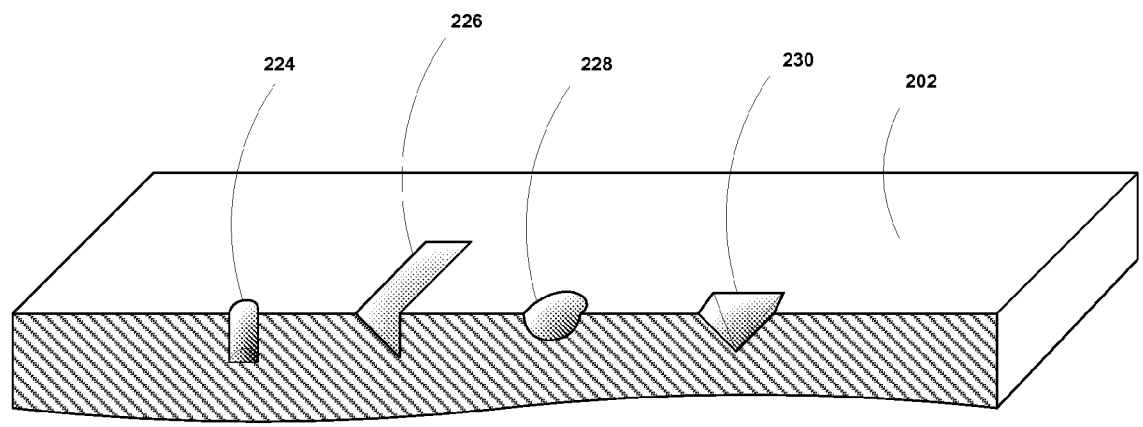
FIG. 2C is a schematic cutaway perspective view of a distal surface of an optical system, in accordance with an example embodiment.

FIG. 2C is a schematic cutaway perspective view of a distal surface 202 of an optical system. FIG. 2C also depicts light-scattering structures in several alternative geometries. For instance, the light-scattering structures could be implemented as embossed cylinders 224, inverted ramp shapes 226, hemispheres 228, and inverted pyramids 230, to name a few possibilities. Parallel trenches, such as those in diffractive coupling gratings may be utilized in various embodiments as well. The size and shape of individual light-scattering structures could be consistent within a single optical system, or could vary within a particular optical system. The size and shape of the light-scattering structures may vary depending upon the desired output light spectral content, scattering profile and directionality. The disclosed shapes are for illustration only and are not intended to limit the invention.

Furthermore, although the light-scattering structures depicted in FIG. 2C are embossed into the distal surface 202, other embodiments could include raised structures. Additionally, although the light-scattering structures depicted in FIG. 2C may contain air, the light-scattering structures could comprise a different optical material such as index-matching oil, glass, plastic, or polymer, for instance to create a desirable index of refraction match or difference. These light-scattering structures may be formed using various methods that may include hot embossing, thermoforming, laser ablation, wet and dry etching, metal deposition and liftoff, nanoimprinting, as well as micro- and nanoindentation. One skilled in the art will understand there are other ways to fabricate light-scattering structures.

Figure 2D:
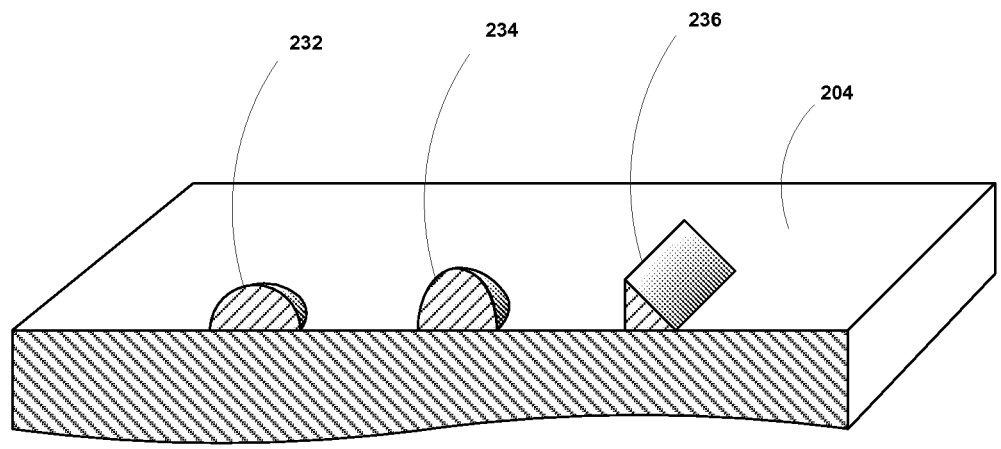
FIG. 2D is a schematic cutaway perspective view of a proximal surface of an optical system, in accordance with an example embodiment.

FIG. 2D is a schematic cutaway perspective view of a proximal surface 204 of a transparent optical element 200. FIG. 2D depicts several possible embodiments of surface lenses. For instance, surfaces lenses could be formed into shapes such as a spherical lens 232, an aspherical lens 234 and a prism shape 236. Other shapes are possible. The size and shape of surface lenses may be varied in order to collect scattered light and form output light with a particular directionality, focus/defocus and spectral content. The size and shape of individual surface lenses could be consistent or vary within a particular optical system.

The surface lenses can be formed using various methods that may include thermal reflow, etching, and successive additive layers of lithographically-defined dielectric material. Other methods known in the art may be utilized to realize surface lenses.

3. HMD with Integrated Optical System

Figure 3A:
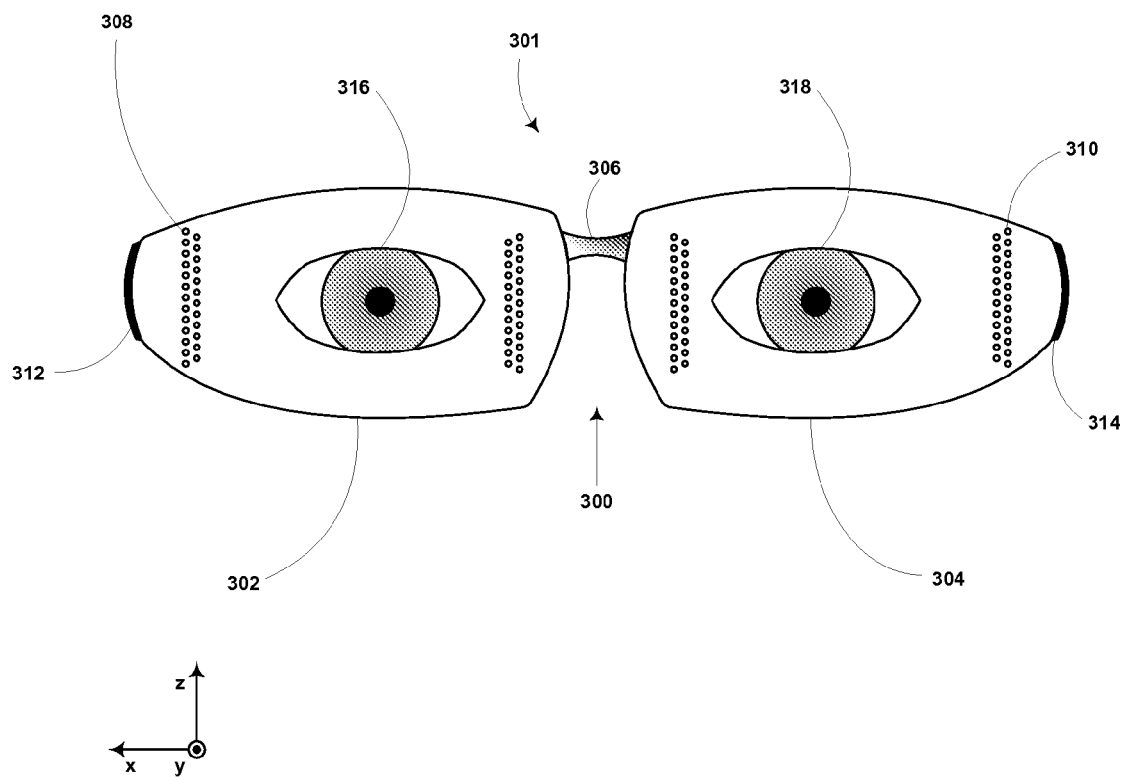
FIG. 3A is a front view of a head-mounted display, in accordance with an example embodiment.
Figure 3B:
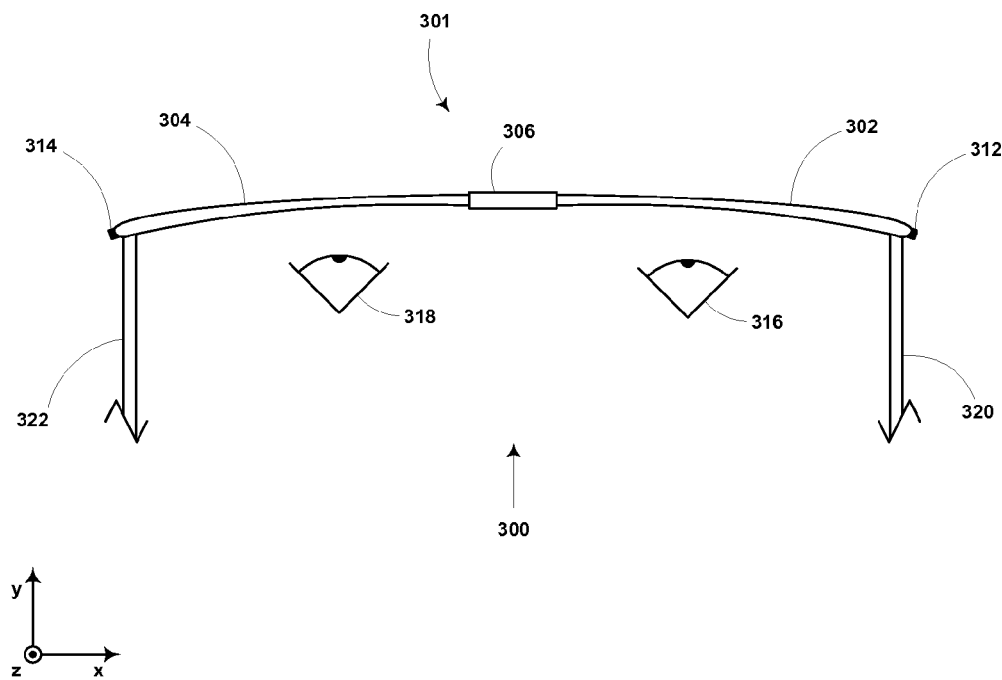
FIG. 3B is a top view of the head-mounted display of FIG. 3A, in accordance with an example embodiment.
Figure 3C:
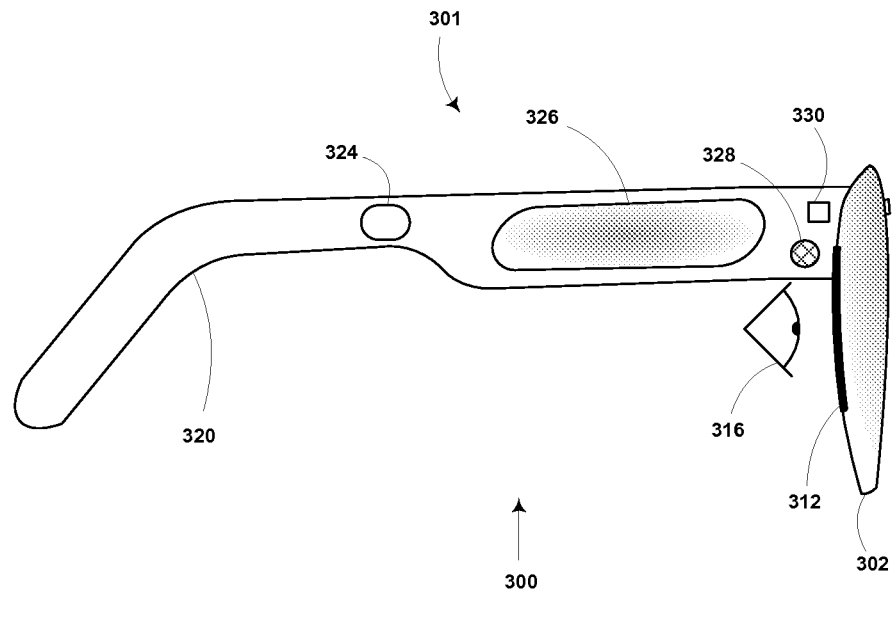
FIG. 3C is a side view of the head-mounted display of FIG. 3A and FIG. 3B, in accordance with an example embodiment.
Figure 3C:
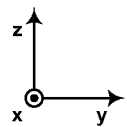

FIG. 3A presents a front view of a head-mounted display (HMD) 300 in an example embodiment that includes two optical systems on a head-mounted support 301. FIG. 3B and 3C present the top and side views, respectively, of the HMD in FIG. 3A. Although an example embodiment is provided in a glasses format, it will be understood that wearable computing systems and HMDs may take other forms, such as hats, goggles, visors, masks, headbands and helmets.

The head-mounted support 301 includes a center support 306, and extending side-arms 320 and 322. The center support 306 and side-arms 320 and 322 are configured to secure the head-mounted support to the wearer's head via the wearer's nose and ears, respectively. Each of the frame elements such as the center frame support 306 and the extending side-arms 320 and 322 may be formed of a solid structure of plastic or metal, or may be formed of a hollow structure of similar material so as to allow wiring and component interconnects to be internally routed through the head-mounted support. Alternatively or additionally, head-mounted support may support external wiring. Lens elements 302 and 304 are at least partially transparent so as to allow the wearer to look through them. In particular, the wearer's left eye 318 may look through left lens 304 and the wearer's right eye 316 may look through right lens 302.

Lens elements 302 and 304 may be used as the transparent optical elements 108 in the optical system 102 described above. Thus, light-scattering structures could be formed on the distal surface of lens elements 302 and 304. Further, surface lenses could be formed on the proximal surface of the lens elements 302 and 304. The positions of these light-scattering structures and corresponding surface lenses are depicted as image-forming locations 308 and 310.

Regardless of the actual physical location of the image-forming locations 308 and 310, each respective image-forming location may be configured to project an output light beam substantially towards a viewing location with a particular angle and position with respect to the wearer's eye. The image-forming locations 308 and 310, which may also be termed 'light pixels', may include an organized array on lens elements 302 and 304, similar to a traditional square array of display pixels. However, in contrast to a traditional display, because of the possibility to configure an image-forming location to deliver a collimated output light beam at a particular incident angle and position at a viewing location, a square array of light pixels is not needed. Thus, the image-forming locations 308 and 310 could comprise locations that are outside the center portion of lens elements 302 and 304 as shown in FIG. 3A.

In particular, image-forming locations 308 and 310 could take up a relatively small percentage, in one embodiment less than 20%, of the surface area of lens elements 302 and 304. The image-forming locations 308 and 310 could include individual locations inside and outside the central viewing area of the wearer. For instance, in an example embodiment, a small set of light pixels could be located along a neutral gaze axis of the wearer for calibration/fitting, while the majority of light pixels could be located outside the user's central field of view. One design consideration may include avoiding putting the light pixels within the field of central vision of a wearer in order to provide the clearest possible view of the real-world. Light pixels may cause small distortions of the real-world view, which may not be desirable.

As described previously, virtual images may appear to a wearer of the HMD as if at an apparent distance. The apparent distance of a virtual image may be based upon, for instance, the actual distance to a target object to which the virtual image may be associated. Each different apparent distance may include a different set of light pixels. Therefore, virtual images with different apparent distances may be displayed to a wearer by selecting the appropriate set of light pixels.

The rastering light source 312 and 314 may produce light that could be collimated into output light beams by a set of image-forming locations 308 and 310 based on a selected or desired virtual image. Thus, a combination of output light beams from a plurality of image-forming locations 308 and 310 may produce a complete virtual image that is viewable from a viewing location (such as a wearer's eye). Although this example includes an optical system 102 for each of the wearer's eyes, it is to be understood, that a HMD might include an optical system for only one of the wearer's eyes (either left eye 318 or right eye 316).

The rastering light source 312 and 314 could be configured to deliver collimated light to an individual light-scattering structure. The light delivery could occur through side surfaces of the lens elements 302 and 304, as depicted in FIG. 3A, 3B and 3C. Alternatively, light from the rastering light source 312 and 314 could be delivered through the proximal or distal surfaces of lens elements 302 and 304. For instance, rastering light source 312 and 314 could be located on the inside of side-arms 320 and 322 to deliver light through the proximal surface of lens elements 302 and 304. As an alternate example, a rastering light source could be mounted on an underside of the brim of a baseball-style cap to deliver light through the distal surface of lens elements 302 and 304.

During the fabrication of the optical system in the HMD, the location, shape and orientation of surface lenses and/or light-scattering structures may be customized to a particular HMD wearer. For instance, the position of various optical elements may depend upon physical characteristics of the wearer, such as the wearer's interocular distance. Additionally, other physiological differences, such as color blindness or eye shape, may merit customization for various wearers.

The customization process may consist of fabricating the optical system based on measurements and optical tests of the wearer. Alternatively, customization may take place 'live' with the wearer actually wearing the HMD device while light-scattering structures are formed. 'Live' customization may include wearer feedback to calibrate the fabrication process.

As described in FIG. 1, the HMD wearer may simultaneously observe from lens elements 302 and 304 a real-world image with an overlaid virtual image. The HMD may include various elements such as a HMD computer 324, a touchpad 326, a microphone 328, a button 330 and a camera (not pictured). The computer 324 may use data from, among other sources, various sensors and cameras to select the virtual image that should be displayed to the user. Those skilled in the art would understand that other user input devices, user output devices, wireless communication hardware, sensors, and cameras may be reasonably included in such a wearable computing system.

The HMD computer 324 may independently select the virtual image to display. For instance, by obtaining an image from the camera 118 and the HMD computer 324 may use image recognition to determine an object of interest. The image recognition algorithm may, for instance, compare the image from the camera 118 to a collection of images of objects of interest. Consequently, the HMD computer 324 may determine that an object of interest is nearby and control the optical system 102 display a virtual image based on that object of interest. Additionally, the wearer of the HMD may select the virtual image to be displayed by the optical system 102. For instance, an example embodiment may utilize a wearer action in order to select a preferred type of virtual imagery. A preferred type of virtual imagery could include, in one example, a preferred font size of virtual image text. In the example embodiment, the wearer may use the touchpad 326 or button 330 to select his or her preference. In another example embodiment, the wearer may perform a gesture recognizable by the camera 118 and HMD computer 324 to produce an input selection.

The HMD computer 324 may control the light source 312 and 314 in order to adjust other aspects of the virtual image. For instance, the light source 312 and 314 may be controlled using the HMD computer 324 to adjust the display location of the virtual image as well as the virtual image brightness and contrast.

Figure 4:
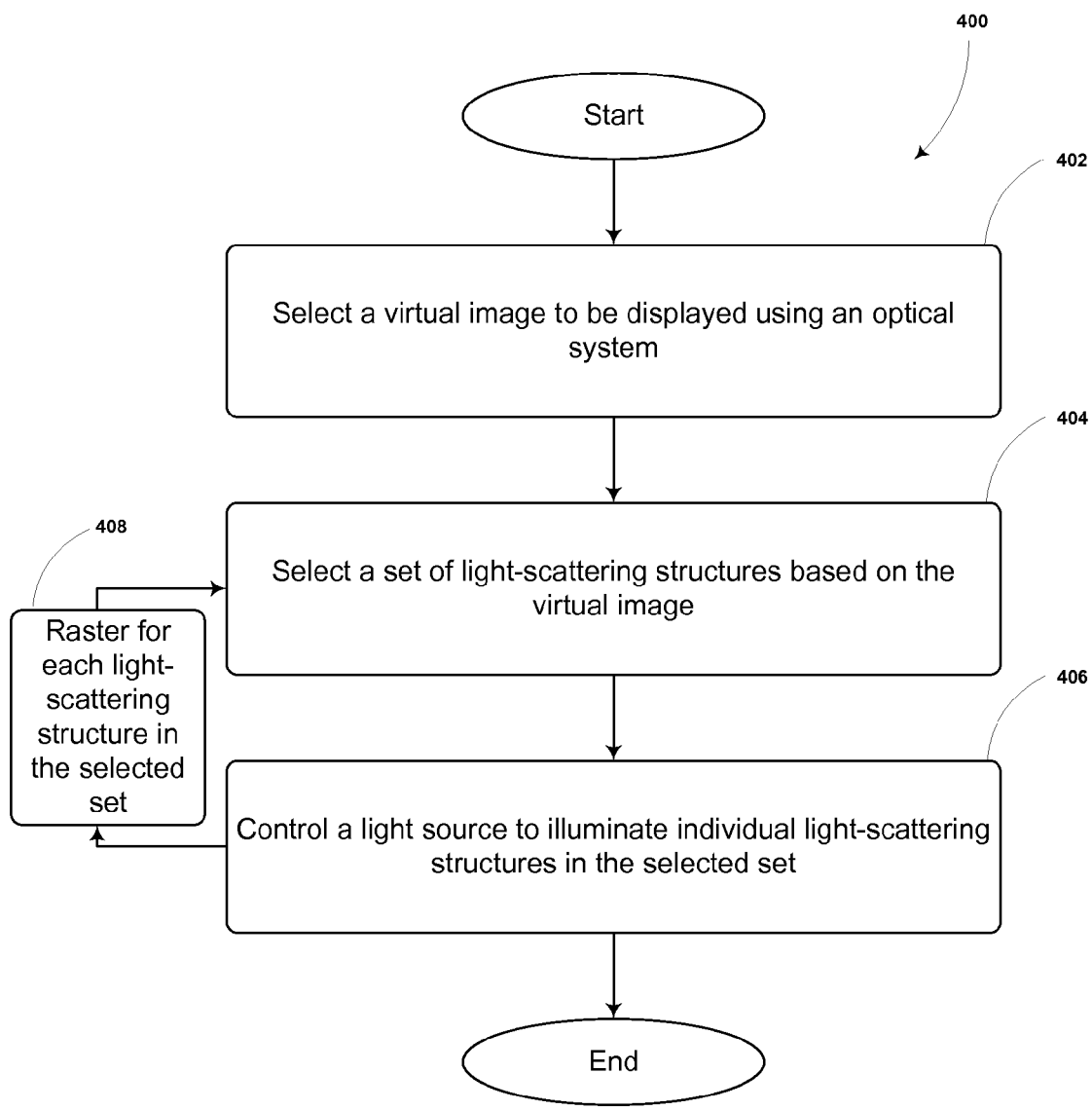
FIG. 4 is a flowchart illustrating a method, in accordance with an example embodiment.

4. Method in an Optical System of Forming Virtual Images by Illuminating Light-Scattering Structures A method 400 is provided for an optical system to display a virtual image by illuminating individual light-scattering structures. The optical system could be in an HMD and could be configured as shown in FIGS. 3A, 3B, and 3C. FIG. 4 illustrates the steps in an example method, however, it is understood that in other embodiments, the steps may appear in different order and steps may be added or subtracted.

In the method, a virtual image to be displayed from an optical system is selected, as shown in step 402. This selection could involve the intervention of a user to choose a desired virtual image or could be performed automatically by the processor 120 of a head-mounted display 104. For instance, in the embodiment where the virtual image selection may be performed automatically by the processor 120, sensors 128 and camera 118 of an HMD 104 may detect the presence of a target object within the field of view of camera 118. The processor 120 may query data storage 126 for a set of relevant virtual images related to the target object that may be displayed. Upon receiving information regarding relevant virtual images, the processor 120 may then select a particular virtual image, taking into account, for instance, the distance to the target object and the characteristics of the target object itself.

In step 404, a set of light-scattering structures based on the virtual image is selected. The selection of the set of light-scattering structures may be performed by processor 120 after receiving data regarding the virtual image from data storage 126. Alternatively, processor 120 could receive the virtual image data from a server network or a target object. The virtual image data may include specific information regarding a set of light-scattering structures or the virtual image data may be processed further by processor 120 in order to determine a set of light-scattering structures. The processor 120 may then select a set of light-scattering structures based on the selected virtual image.

The selected set of light-scattering structures could include as few as a single light-scattering structure from a particular image-forming location from image-forming locations 308 and 310, or up to as many as the entire number of light-scattering structures in the image-forming locations 308 and 310. In an example embodiment, in order to form a virtual image, for instance made up of text, the selected set of light-scattering structures could include several image-forming locations.

In step 406, a light source is controlled to illuminate individual light-scattering structures in the selected set. In one embodiment, the processor 120 may control a semiconductor laser diode 110 and associated galvanometer 114 in order to illuminate an individual light-scattering structure in the selected set. In turn, the light source may be rastered or otherwise controlled to illuminate other light-scattering structures in the selected set in order to completely form the selected virtual image.

In optional step 408, the light source may be rastered to illuminate each light-scattering structure in the selected set. For instance, the selected set of an example embodiment may include several image-forming locations to form a virtual image of text. Thus, each of these image-forming locations may be rastered in a serial fashion. Additionally, image-forming locations may be illuminated in an interleaved fashion similar to some traditional display technologies. For instance, the virtual image may be formed by displaying every other row of the virtual image to a wearer in a single vertical pass. Alternatively, the image-forming locations may be illuminated in a parallel fashion, for instance using multiple light sources to illuminate different light-scattering structures at one time. The processor 120 may, either automatically or through user interaction, determine that the virtual image no longer needs to be displayed or needs to be replaced by a new virtual image (that may include a different set of light-scattering structures). In this example, the method could return to step 402 to display the new virtual image or the method could end without rastering each light-scattering structure in the selected set.

4. Other Example Embodiments

Although several example embodiments disclosed above incorporate an optical system in a head-mounted display, it will be understood to those skilled in the art that other embodiments of the optical system are possible. The optical system may be incorporated into any ocular lens or transparent element. The example embodiments below serve to illustrate a few such possibilities and are not intended to be limiting with regards to other applications or uses of the aforementioned optical system.

Figure 5:
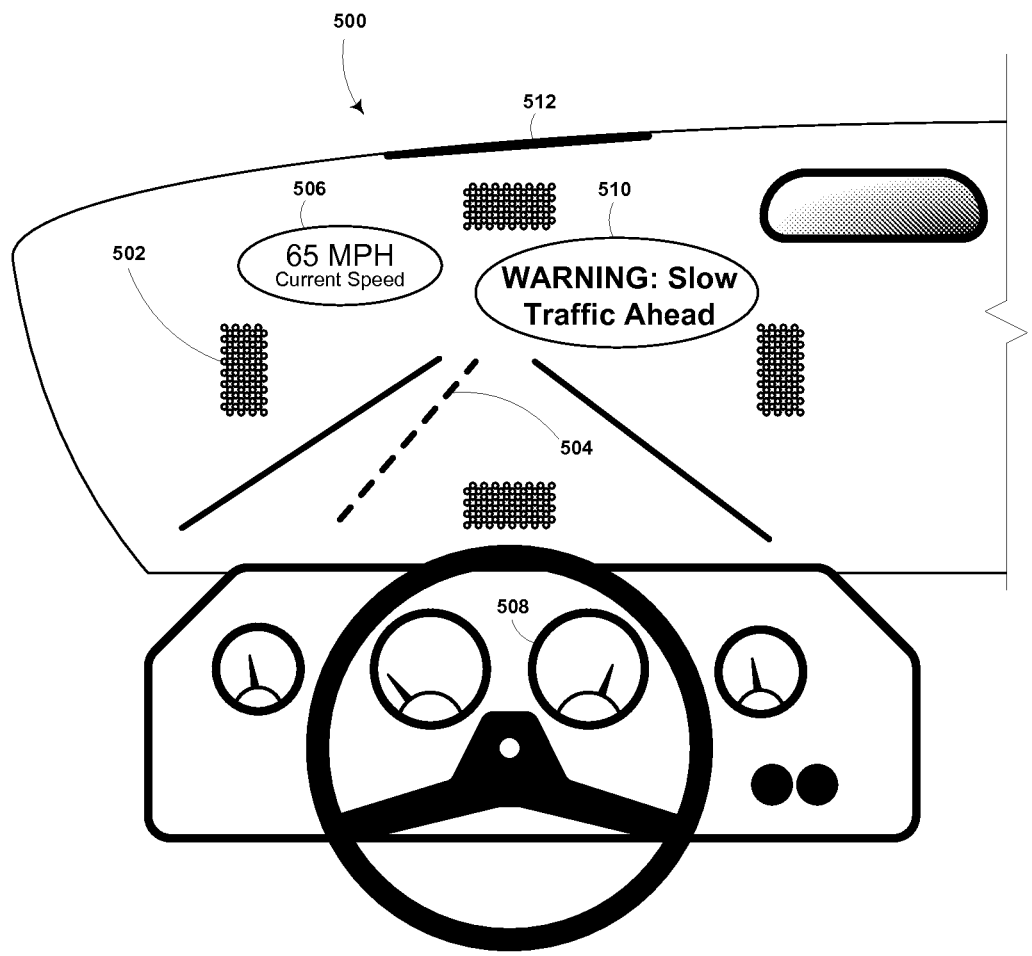
FIG. 5 is an automobile driver's view, in accordance with an example embodiment.

For instance, the optical system may be incorporated into the windshield of an automobile. Specifically, FIG. 5 is an automobile driver's view 500. Light pixels 502 may be incorporated into the automobile windshield. Further, the light source 512 may be located away from the light pixels 502 on the top side of the windshield.

Information useful to the driver could be displayed using the array of light pixels, which may display a virtual image to a driver. For instance, the message 506, "65 MPH Current Speed" may appear as a virtual image near the center of the driver's field of view while the driver is concentrating on the road 504. Observing this message may be more convenient and safe than the driver looking down at the speedometer 508 in the instrument panel. Warning and emergency messages could also be displayed to the driver in virtual images. For instance, the message 510, "WARNING: Slow Traffic Ahead" may be a useful alert message to the driver.

Figure 6:
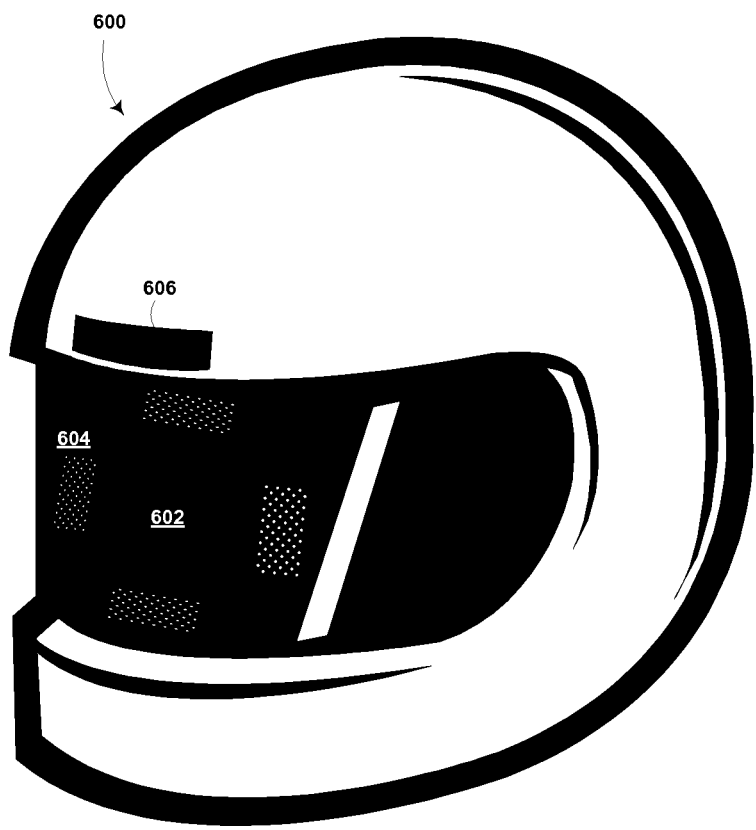
FIG. 6 is a motorcycle helmet and visor, in accordance with an example embodiment.

In another example embodiment, the optical system could be incorporated into a helmet visor. FIG. 6 is a motorcycle helmet 600 and visor. In this example embodiment, light pixels 604 could be fabricated in the visor of helmet. Further, the light source 606 could be incorporated into the helmet in order to illuminate the light pixels. In turn, a virtual image may be displayed to a wearer. The light pixels 604 could be arranged away from the central area of the visor 602 in order to minimize distortion in the wearer's central vision. Although the example embodiment shows a motorcycle helmet, it is possible to incorporate the optical system into other types of helmets, such as helmets used in airplanes or other vehicles.

In yet another example embodiment, the optical system could be incorporated into an optical device, such as a telescope, a microscope, binoculars, or a viewfinder (such as a camera viewfinder). In such cases, the ocular lens may be used as the transparent element. Thus, light scattering structures may be provided on the distal surface of the ocular lens and positionally-corresponding surface lenses may be provided on the proximal surface of the ocular lens, such that the light scattering structures and surface lenses function together as a plurality of light pixels.

Figure 7:
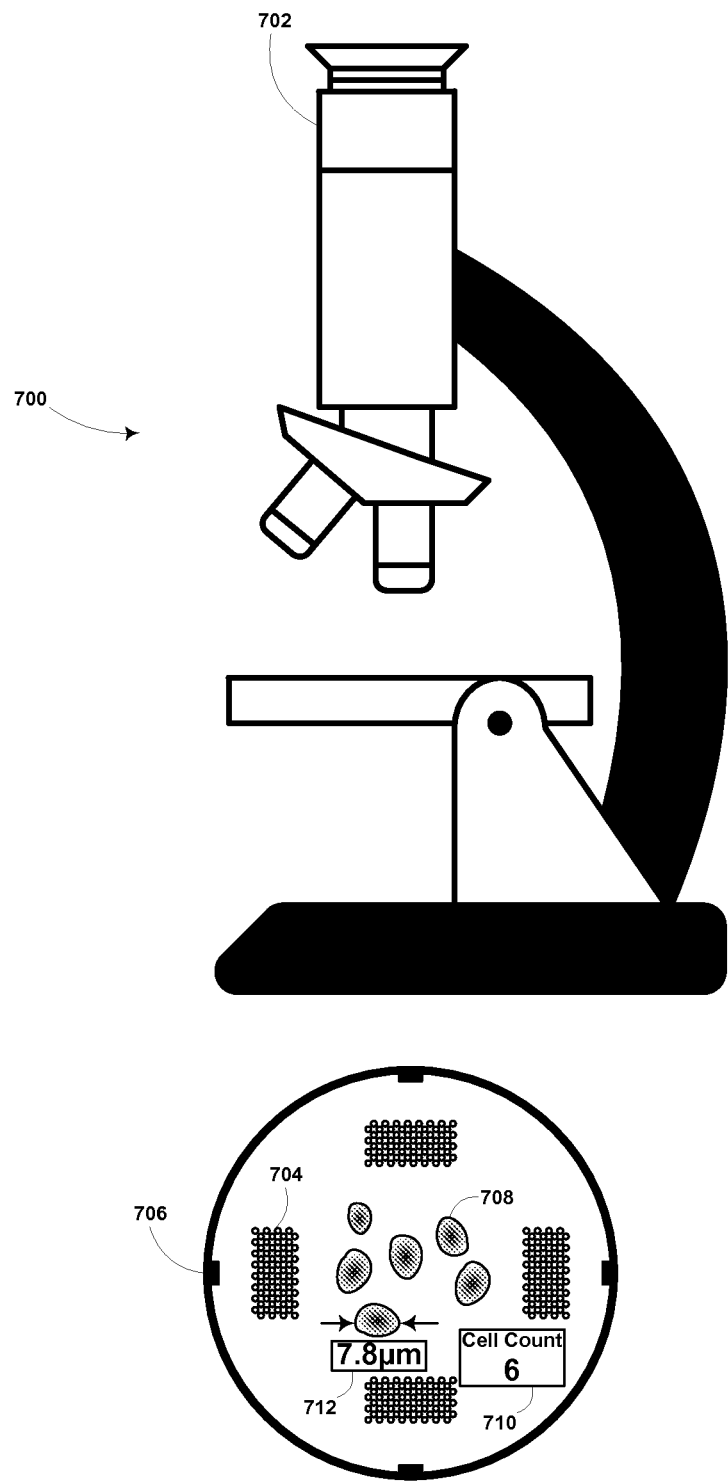
FIG. 7 shows a side view of a microscope and a view through the eyepiece of the microscope, in accordance with an example embodiment.

For example, FIG. 7 shows a side view of a microscope 700 and a view through the eyepiece 702. In this example embodiment, light pixels 704 could be fabricated on the ocular lens in eyepiece 702 and may be illuminated with light sources 706 located around the edge of the field of view. Various information and messages could be displayed in virtual images to the microscope user. For instance, when observing cells 708, a user may receive information regarding the cells, such as a message 710, "Cell Count 6". Alternatively, a message regarding the size of a cell may be displayed, such as message 712, "6.5 μm."

The ocular lenses in other types of optical devices, such as telescopes, binocular, and camera viewfinders may similarly be provided with light pixels that can be selectively illuminated by light sources to display virtual images to the user. The virtual images may, for example, provide instructions or information regarding the user's use of the optical device and/or information relating to objects that are observable through the ocular lens.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An optical system, comprising:
 a transparent element comprising a proximal surface, and a distal surface opposite the proximal surface, wherein a real-world environment is viewable through the proximal surface in combination with the distal surface;
 a plurality of light-scattering structures on the distal surface, wherein the plurality of light-scattering structures comprises a respective plurality of pits in the distal surface, and wherein each pit comprises at least one of a substantially hemispherical shape or a substantially cylindrical shape;
 a rastering light source configured to selectively illuminate individual light-scattering structures in the plurality of light-scattering structures on the distal surface; and
 a plurality of surface lenses on the proximal surface, wherein each surface lens is optically coupled to at least one respective light-scattering structure so as to collimate light scattered therefrom towards a viewing location.

2. The optical system of claim 1, wherein the rastering light source comprises:
 at least one laser configured to emit at least one laser beam; and
 a galvanometer optically coupled to each at least one laser and configured to selectively direct the at least one laser beam.

3. The optical system of claim 1, wherein each surface lens comprises at least one aspherical microlens.

4. The optical system of claim 1, wherein each surface lens comprises at least one spherical microlens.

5. The optical system of claim 1, wherein the transparent element comprises a lens.

6. The optical system of claim 1, wherein the transparent element is in a head-mounted display (HMD).

7. The optical system of claim 1, wherein the transparent element is a visor of a helmet.

8. The optical system of claim 1, wherein the transparent element is a vehicle windshield.

9. The optical system of claim 1, wherein the transparent element is an ocular lens of an optical device.

10. The optical system of claim 9, wherein the optical device comprises a telescope, a microscope, binoculars, or a viewfinder.

11. A head-mounted display (HMD), comprising:
 a head-mounted support; and
 at least one optical system attached to the head-mounted support, wherein the at least one optical system comprises:
 (a) a transparent element comprising a proximal surface, a distal surface opposite the proximal surface, and a side surface, wherein a real-world environment is viewable through the proximal surface in combination with the distal surface;
 (b) a plurality of light-scattering structures on the distal surface, wherein the plurality of light-scattering structures comprises a respective plurality of pits in the distal surface, and wherein each pit comprises at least one of a substantially hemispherical shape or a substantially cylindrical shape;
 (c) a rastering light source configured to selectively illuminate individual light-scattering structures in the plurality of light-scattering structures on the distal surface through the side surface of the transparent element; and (d) a plurality of surface lenses on the proximal surface, wherein each surface lens is optically coupled to at least one respective light-scattering structure so as to collimate light scattered therefrom towards a viewing location.

12. The HMD of claim 11, further comprising a processor, wherein the processor is configured to control the rastering light source.

13. The HMD of claim 11, wherein the rastering light source comprises:

at least one laser configured to emit at least one laser beam; and a galvanometer optically coupled to the at least one laser and configured to selectively direct the at least one laser beam.

14. The HMD of claim 11, wherein each surface lens comprises at least one aspherical microlens.

15. The HMD of claim 11, wherein each surface lens comprises at least one spherical microlens.

* * * * *